United States Patent
Eberling et al.

(10) Patent No.: US 6,179,391 B1
(45) Date of Patent: Jan. 30, 2001

(54) RELAY VALVE WITH INTEGRAL BIASED DOUBLE CHECK VALVE

(75) Inventors: Charles E. Eberling, Wellington; Gary R. Hendershot, Amherst; John J. Kemer, Avon Lake; Andrew Marsh, Elyria; Richard T. Ross, Wakeman; Chris G. Swansegar, North Olmsted, all of OH (US)

(73) Assignee: AllliedSignal Truck Brake Systems Company, Elyria, OH (US)

( * ) Notice: Under 35 U.S.C. 154(b), the term of this patent shall be extended for 0 days.

(21) Appl. No.: 09/240,805

(22) Filed: Feb. 1, 1999

(51) Int. Cl.⁷ ..................................................... B60T 17/04
(52) U.S. Cl. ................. 303/29; 303/86; 303/81; 303/8
(58) Field of Search .................. 303/3, 15, 86, 303/81, 29, 40, 8

(56) References Cited

U.S. PATENT DOCUMENTS

| | | | |
|---|---|---|---|
| 1,765,634 | * | 6/1930 | Stewart ................................. 303/29 |
| 1,774,174 | * | 8/1930 | Down ................................... 303/29 |
| 1,824,053 | * | 9/1931 | McCune ............................... 303/29 |
| 2,897,012 | | 7/1959 | Vorech . |
| 3,001,831 | | 9/1961 | Stelzer . |
| 3,059,975 | * | 10/1962 | Morse ................................... 303/29 |
| 3,092,130 | | 6/1963 | Hewitt . |
| 3,574,413 | | 4/1971 | Euga . |
| 3,592,215 | | 7/1971 | Davis . |
| 3,941,428 | | 3/1976 | Rothwell et al. . |
| 3,970,100 | | 7/1976 | Jones . |
| 4,007,815 | * | 2/1977 | Acre ..................................... 188/265 |
| 4,139,238 | * | 2/1979 | Hoffman ................................. 303/7 |
| 4,146,275 | * | 3/1979 | Elliott et al. ......................... 303/82 |
| 4,605,262 | | 8/1986 | Bartholomew . |
| 5,042,883 | | 8/1991 | McCann et al. . |
| 5,046,786 | | 9/1991 | Johnston et al. . |
| 5,236,250 | | 8/1993 | Moody et al. . |
| 5,346,291 | | 9/1994 | Marsh et al. . |
| 5,358,315 | * | 10/1994 | Balukin ................................. 303/15 |
| 5,393,129 | | 2/1995 | Troiani et al. . |
| 5,458,402 | | 10/1995 | Jeffery . |
| 5,553,928 | | 9/1996 | Hart et al. . |
| 5,666,995 | * | 9/1997 | Herbst et al. ......................... 303/40 |
| 5,709,246 | | 1/1998 | Koelzer . |
| 5,722,740 | * | 3/1998 | Engelbert et al. ................. 303/118.1 |

* cited by examiner

*Primary Examiner*—Robert J. Oberleitner
*Assistant Examiner*—Devon Kramer

(57) ABSTRACT

A braking system is able to meet emergency stopping distance requirements associated with a failed rear axle service control line by modifying the service relay valve. The service relay valve incorporates a biased double check valve so that an additional or secondary control line from the foot control valve communicates with the service port of the relay valve. If the primary circuit is operational, a biasing force imposed on the double check valve permits normal operation via the primary service line. On the other hand, if the primary service line is lost, the biasing force is overcome and communication between the secondary service line and the service port of the relay valve is established.

7 Claims, 4 Drawing Sheets

RELAY VALVE WITH INTEGRAL BIASED DOUBLE CHECK VALVE

BACKGROUND OF THE INVENTION

This invention pertains to the art of brake systems for heavy vehicles, and more particularly to an air brake system that satisfies recent standards imposed with regard to emergency brake performance. It will be appreciated that as a result of the modifications taught by the present invention, the air brake systems can now meet new emergency stopping distance requirements with a failed rear axle service control line.

In presently available truck brake systems, depressing a foot pedal or treadle actuates a foot control valve to actuate air brakes associated with the wheels. Dual supply ports and dual delivery ports are provided with the foot control valve in order to achieve desired front and rear braking. In systems of this type, a relay valve is associated with the rear wheels. The relay valve includes a supply port that communicates with a source of compressed air and an exhaust port that communicates with ambient or atmosphere. A delivery port is in operative communication with the wheel brake actuators to effect desired braking. In addition, and in accordance with known systems, a service port of the service relay valve receives a control signal (e.g. pneumatic pressure) from the foot control valve. When the foot control valve is actuated by depressing the foot pedal, pressurized air is delivered to the service port. This, in turn, pressurizes a movable piston that actuates an inlet/exhaust valve in the relay valve to establish communication between the supply port and the delivery port to effect braking.

Recent revisions in the national standards require that a safe stopping distance be achieved with a failed rear axle service control line, i.e., if the service line from the foot control valve to the relay valve is insufficient, inoperative, etc. then the brake system still must satisfy the emergency stopping distance requirements.

It is also preferred that modifications to existing systems be minimized so that proven designs and components can be used.

Accordingly, a need exists for an effective, simple, and economical solution.

SUMMARY OF THE INVENTION

The present invention contemplates a new and improved relay valve in an air brake system for heavy vehicles that overcomes the above-referenced problems and others and addresses recently promulgated standards regarding emergency stopping distance requirements with a failed rear axle service control line.

According to the present invention, there is provided a relay valve that has a supply port, delivery port and exhaust port in selective communication with one another for effecting braking operation in response to air pressure from a service port. The relay valve, particularly the service port thereof, is modified to incorporate primary and secondary service control lines to accommodate a failed rear axle service control line requirement.

According to the invention, a secondary service line communicates with the foot control valve delivery port so that if pneumatic pressure from the primary service line is interrupted, pressure is still delivered to the service port and actuating piston of the relay valve.

According to another aspect of the invention, the primary and secondary service lines are in operative communication via a biased double check valve. Thus, if a pneumatic signal is present from the primary and secondary circuits, the primary line will control operation of the relay valve while the secondary line provides desired redundancy.

A principal advantage of the invention is the ability to meet the new emergency stopping distance requirements.

Yet another advantage of the invention resides in the simple modifications to the known system to achieve the desired benefits in an economical manner.

Still other advantages and benefits of the invention will become apparent to those skilled in the art upon a reading and understanding of the following detailed description.

BRIEF DESCRIPTION OF THE DRAWING

The invention may take physical form in certain parts and arrangements of parts, a preferred embodiment of which will be described in detail in the specification. The invention is illustrated in the accompanying drawings, in which.

DETAILED DESCRIPTION OF THE PREFERRED EMBODIMENT

Figure 1:
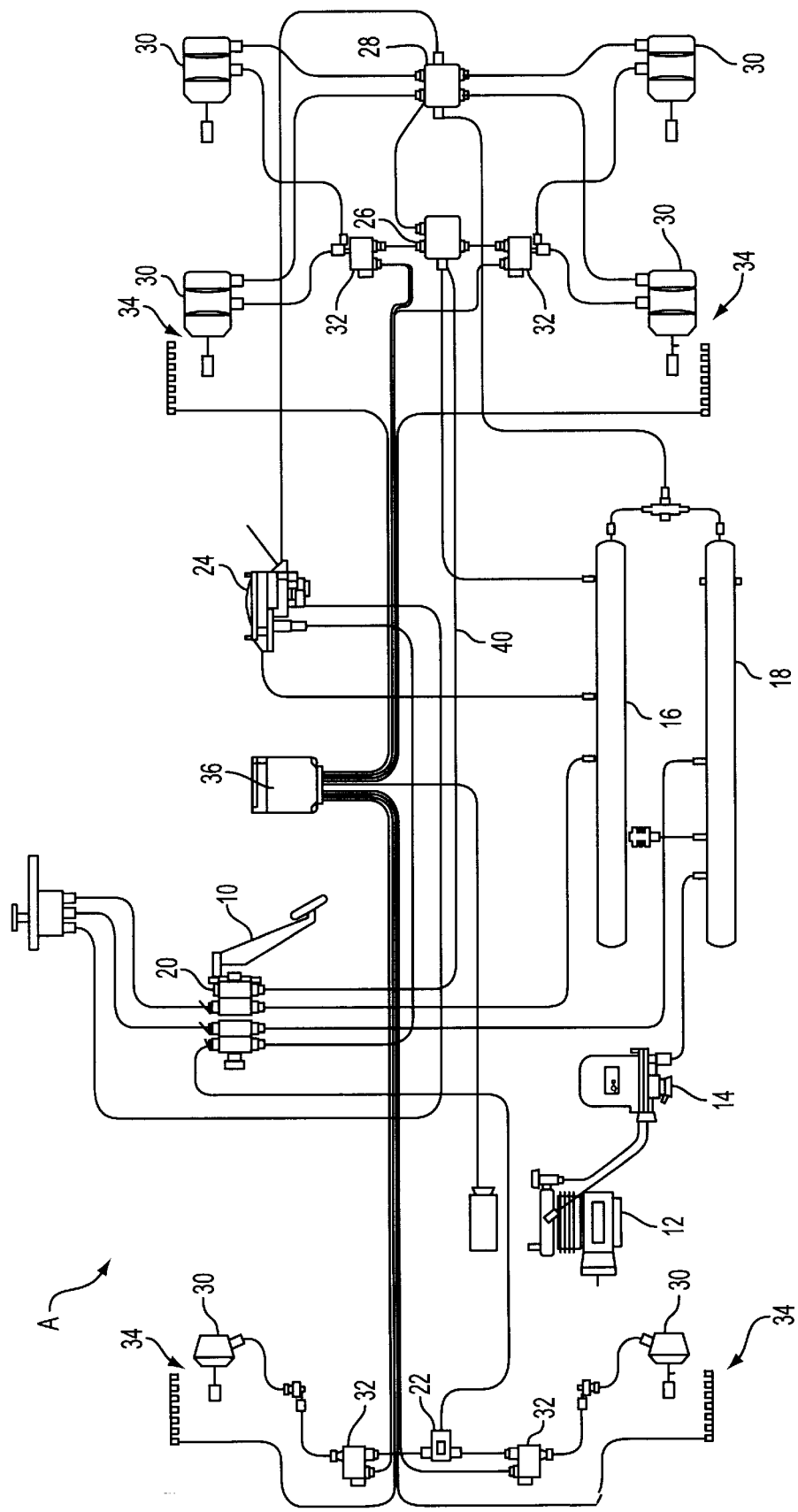
FIG. 1 is a schematic representation of a prior art brake system.

Referring now to the drawings wherein the showings are for the purposes of illustrating the preferred embodiment of the invention only, and where the drawings are not intended to limit the invention, the Figures show a brake system A of the type used for heavy vehicles such as trucks, buses, and the like. More particularly, and with reference to FIG. 1, a prior art brake system is schematically illustrated. The structure and operation of these systems are well known in the art; however, a brief review of the overall system is helpful in understanding the present invention. The braking system is a pneumatic or air brake system in which a pedal or treadle 10 mounted in the truck cab is selectively depressed by the operator. Pressurized air from a compressor 12 passes through an air dryer 14 and is stored in primary and secondary service reservoirs 16, 18, respectively. A dual system control valve 20 is actuated by the foot pedal to provide air pressure from the reservoirs to valves 22 associated with the front axle, and valves 24, 26, 28 associated with the rear axles. These valves control air pressure to brake chambers 30 associated with the individual wheels.

Brake systems of this type include an antilock brake system (ABS) which modifies brake application through modulators 32 if an impending wheel lockup is sensed. Speed sensors 34 associated with the wheels monitor rotation of the wheels and send signals to an ABS electronic control unit (ECU) 36. In a manner well known in the art, solenoid valve assemblies associated with the modulators 32 are independently controlled by the ECU 36. By opening and closing the solenoid valves, the antilock ECU simulates brake pumping but at a rate substantially faster than the driver of a vehicle could actually pump the brakes to avoid skidding.

As referenced in the Background portion of the specification, recent standards require that brake systems meet predetermined emergency stopping distance requirements with a failed rear axle service control line. In FIG. 1, this rear axle service control line is represented by numeral 40. It leads from the foot control valve 20 to the service relay valve 26. If this service control line is interrupted, blocked, or impaired, the new standards require that emergency stopping distance requirements still be met.

Figure 2:
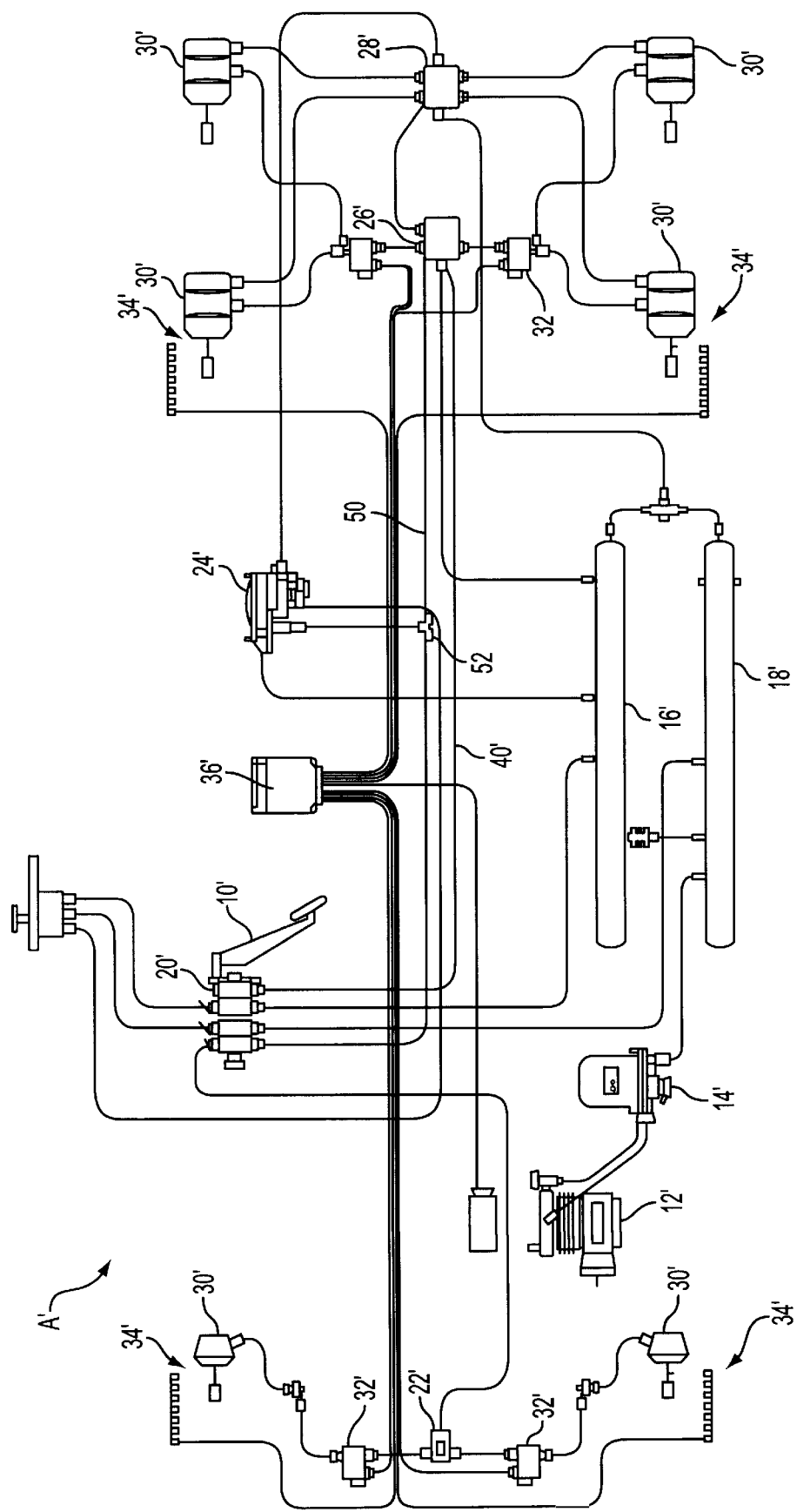
FIG. 2 is a view similar to FIG. 1 and illustrating a schematic of the present invention.

FIG. 2 schematically illustrates how this problem is overcome in accordance with the teachings of the subject invention. Particularly, and for purposes of consistency, like elements are referred to by like numerals with a primed suffix for ease of illustration and understanding. One of the new components or modifications is a continuation of a secondary or additional service control line 50 leading from the foot control valve to the service relay valve 26'. For example, the secondary line that extended from the foot control valve to the spring brake valve 24' is modified to incorporate a junction 52 so that secondary control line 50 provides air pressure from the foot control valve to the service relay valve 26'. In the control schematic of FIG. 2, the service relay valve includes air pressure supplied via the primary control line or primary circuit 40', as well as a secondary control line 50. In addition, the service relay valve 26' incorporates a biased double check valve that allows the service relay valve to operate in substantially the same manner as the system of FIG. 1 if the primary service control line is operational, and still provides air pressure from the foot control valve through the secondary service control line 50 in the event of loss of the primary service line.

Figure 4:
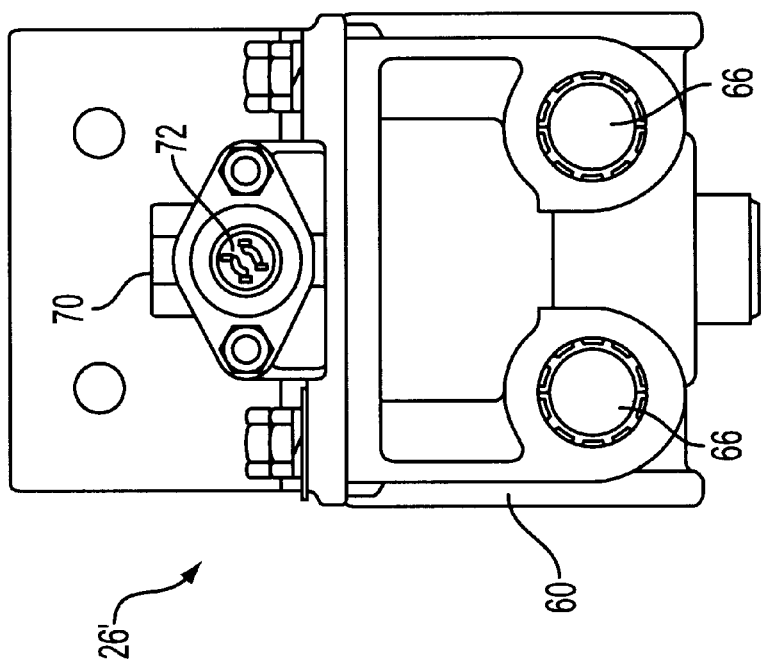
FIG. 4 is an elevational view taken generally from the right-hand side of FIG. 3.
Figure 3:
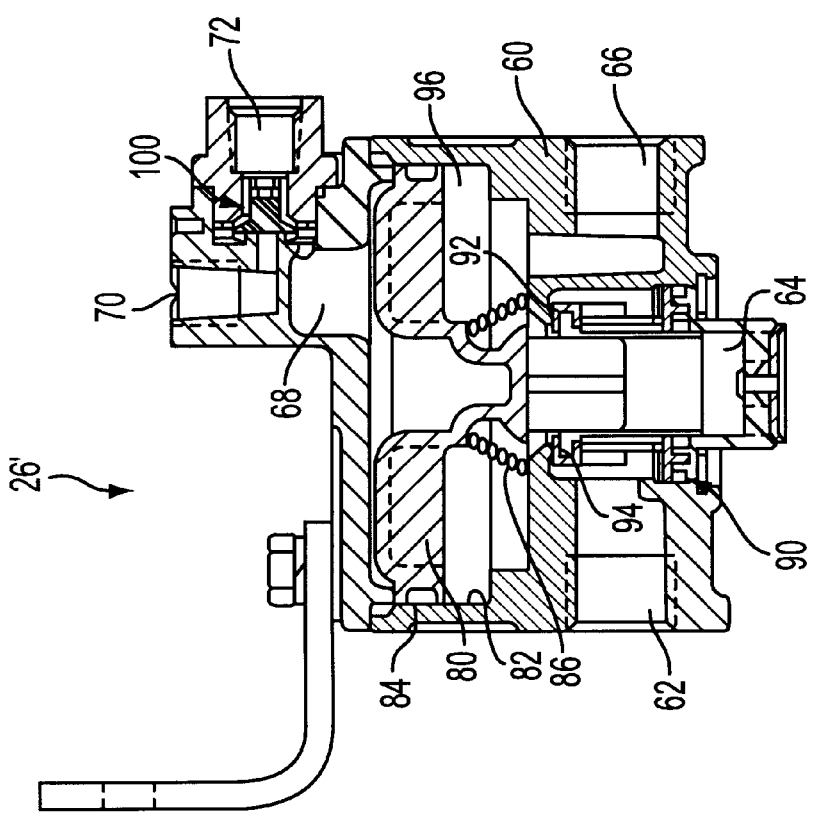
FIG. 3 is a cross-sectional view through the new relay valve.
Figure 5:
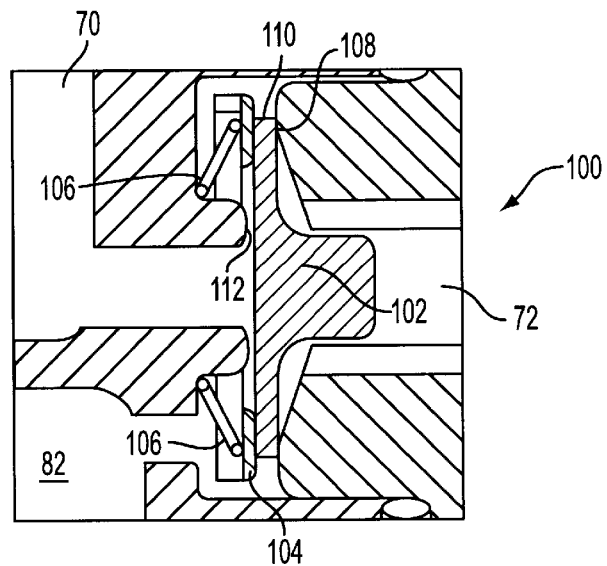
FIG. 5 is an enlarged detail view of the biased double check valve assembly.

With continued reference to FIG. 2, and additional reference to FIGS. 3-5, the modifications to the service relay valve 26' will be described. Again, although generally known in the art, the following brief description of the service relay valve will prove helpful in comprehending the overall environment, structure, and function of the subject invention. A relay valve housing 60 includes a supply port 62, an exhaust port 64, a delivery port(s) 66, and a service port 68. The supply port communicates with a compressed air source 16' or 18' (FIG. 2) while the exhaust port 64 communicates with ambient. The delivery ports 66 communicate with the brake actuators 30' associated with the wheels.

Service port 68 receives pressurized air from either the primary service line 40, where it communicates with the primary port 70, or the secondary service line 50 that connects with secondary port 72. As will be described in greater detail below, ports 70 and 72 selectively communicate with the service port 68 depending on the position of the biased double check valve. The pressurized service air acts on the upper side of moveable piston 80 received in cavity 82 of the housing. The piston is sealed about its periphery by seal member or O-ring 84 engaging the interior wall of the housing that defines the cavity. A biasing member, such as spring 86, normally urges the piston 80 toward a first or upper position as shown in FIG. 3. As air from the service port 68 pressurizes a first or upper side of the piston in the relay valve, the piston 80 moves downwardly to close exhaust port 64. As will be appreciated, the delivery port 66 is normally in communication with the exhaust port 64 in the position shown in FIG. 3 and likewise the supply port 62 and delivery port 66 are not in communication. Movement of the piston downwardly urges the inlet/exhaust valve assembly 90 downwardly to move a sealing surface 92 away from an inlet valve seat 94. This establishes communication between the supply port 62 and the delivery port 66 through volume 96. Thus, the brakes are applied. Upon release of service braking, air is relieved on the upper side of the relay piston 80. The delivery air in cavity 96, and an assistance from spring 86, urges the relay piston upwardly to the position shown in FIG. 3. Consequently, the delivery port 66 is connected to the exhaust port, again, as shown in FIG. 3.

Figure 6:
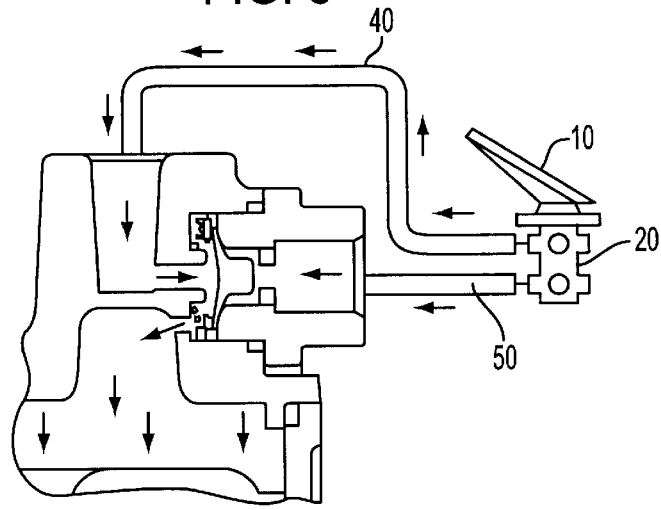
FIG. 6 is a partly schematic representation of a primary service control line operating the relay valve.
Figure 7:
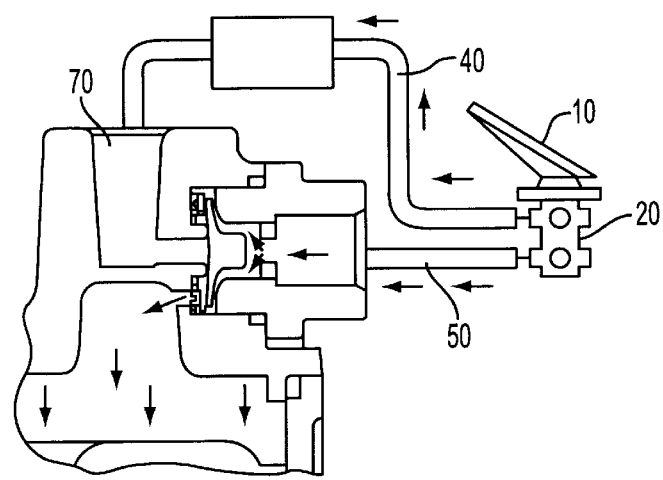
FIG. 7 is a view similar to FIG. 6 and illustrating operation of the relay valve via the secondary service control line.

A biased double check valve 100 is interposed between the primary and secondary service ports 70, 72. In the preferred embodiment, the biased double check valve assembly includes a flexible diaphragm 102 as more particularly illustrated in FIG. 5. A guide member 104 is interposed between the diaphragm 102 and a biasing member or spring 106. The spring urges the diaphragm so that an outer perimeter, seal surface 108 is brought into sealing engagement with a valve seat 110. As described above, during normal service braking when pressurized air is provided through the primary control line to port 70, pressurized air from the secondary circuit at port 72 is shut off. This is best exemplified in FIG. 6 where the primary circuit is viable and flow proceeds from service port 70, past the diaphragm 102, and into piston chamber 82 of the relay valve. The spring exerts a predetermined force against the diaphragm so that a pressure differential of, for example, two to eight pounds per square inch (psi) is required to overcome the spring force and allow flow from the secondary port 72 to reach the piston chamber 82. That situation is illustrated in FIG. 7. There, the primary service line is illustrated as being blocked or failing to communicate service pressure from the foot control valve to the service port 70 of the relay valve. The pressure in secondary line 50 overcomes the biasing force of spring 106 and moves the diaphragm against valve seat 112. This shuts off communication between the port 70 and the piston chamber 82 and establishes communication between the secondary service port 72 and piston chamber 82. In this manner, effective braking is achieved through the secondary service line to operate the relay valve and provide the desired pressure to the brake chambers if operation through the primary service line is lost.

It will be recognized that if both signals are present and both service lines operative, then the double biased check valve provides communication through the primary service line due to the additional biasing force imposed on the check valve by the spring 106.

The invention has been described with reference to the preferred embodiment. Obviously, modifications and alterations will occur to others upon a reading and understanding of the specification. For example, alternative biased check valve arrangements can be used as opposed to the diaphragm arrangement shown and described in FIGS. 3-7. Nevertheless, all such modifications and alterations insofar as they come within the scope of the appended claims or the equivalents thereof are intended to be covered by the accompanying claims.

Having thus described the invention, it is claimed:

1. A pneumatic pressure braking system for a vehicle comprising:

a pressure source;

a brake;

an operator controlled valve for selectively communicating a signal indicative of operator demand for braking function;

a relay valve in communication with the pressure source, for selectively connecting the brake with the pressure source to effect a braking function; and a primary control line interconnecting the operator controlled valve and the relay valve for communicating the operator demand signal to the relay valve; and a secondary control line interconnecting the operator controlled valve and the relay valve for communicating the operator demand signal to the relay valve only if operation of the primary control line is impaired.

2. The braking system of claim 1 wherein the primary and secondary control lines are air lines interconnecting the operator controlled valve and the relay valve.

3. The braking system of claim 1 further comprising a biased double check valve interposed between the primary and secondary control lines at the relay valve.

4. The braking system of claim 3 wherein the check valve is biased to preclude operative communication of the operator demand signal via the secondary control line when the primary control line is operational.

5. The braking system of claim 4 wherein the check valve includes a spring urging the check valve to preclude communication between the secondary control line and the relay valve.

6. The braking system of claim 3 wherein the check valve is a diaphragm mounted in the relay valve with the primary and secondary control lines communicating with opposite faces thereof.

7. The braking system of claim 6 wherein the check valve includes a biasing spring that urges the diaphragm to close communication of the secondary control line with the relay valve.

* * * * *